(12) United States Patent
Shim et al.

(10) Patent No.: US 9,166,983 B2
(45) Date of Patent: *Oct. 20, 2015

(54) SYSTEM AND APPARATUS FOR ROGUE VOIP PHONE DETECTION AND MANAGING VOIP PHONE MOBILITY

(75) Inventors: Choon B. Shim, Ijamsville, MD (US); Joonbum Byun, Gaithersburg, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,078

(22) Filed: Jul. 24, 2012

(65) Prior Publication Data

US 2012/0287810 A1    Nov. 15, 2012

Related U.S. Application Data

(63) Continuation of application No. 11/217,417, filed on Sep. 2, 2005, now Pat. No. 8,238,352.

(51) Int. Cl.
*H04L 12/28* (2006.01)
*H04L 29/06* (2006.01)
*H04J 1/16* (2006.01)

(52) U.S. Cl.
CPC .......... *H04L 63/101* (2013.01); *H04L 63/1408* (2013.01); *H04L 63/1466* (2013.01)

(58) Field of Classification Search
USPC .................. 370/252, 352–356, 401, 389, 419
See application file for complete search history.

(56) References Cited

U.S. PATENT DOCUMENTS

| | | | |
|---|---|---|---|
| 7,042,985 B1 | 5/2006 | Wright | |
| 7,234,163 B1 * | 6/2007 | Rayes et al. | 726/22 |
| 8,064,580 B1 * | 11/2011 | Apple et al. | 379/114.14 |
| 8,238,352 B2 | 8/2012 | Shim et al. | |
| 2002/0110112 A1 * | 8/2002 | Tuomi | 370/352 |
| 2002/0183056 A1 * | 12/2002 | Lundblade et al. | 455/425 |
| 2003/0018912 A1 * | 1/2003 | Boyle et al. | 713/201 |
| 2003/0126188 A1 * | 7/2003 | Ta et al. | 709/108 |
| 2004/0215976 A1 | 10/2004 | Jain | |
| 2005/0044418 A1 | 2/2005 | Miliefsky | |
| 2005/0076034 A1 | 4/2005 | Addonisio et al. | |
| 2005/0114880 A1 | 5/2005 | Gould | |
| 2005/0232164 A1 * | 10/2005 | Anzarouth et al. | 370/255 |
| 2006/0047800 A1 * | 3/2006 | Caveney et al. | 709/223 |
| 2006/0077988 A1 | 4/2006 | Cheng et al. | |
| 2006/0153167 A1 | 7/2006 | Schunemann | |
| 2006/0209818 A1 | 9/2006 | Purser | |
| 2006/0248229 A1 | 11/2006 | Saunderson et al. | |
| 2007/0192862 A1 | 8/2007 | Vermeulen et al. | |
| 2011/0231574 A1 * | 9/2011 | Saunderson et al. | 709/245 |

OTHER PUBLICATIONS

U.S. Appl. No. 11/217,417, Final Office Action mailed Dec. 16, 2008, 20 pgs.

(Continued)

*Primary Examiner* — John Pezzlo
(74) *Attorney, Agent, or Firm* — Meunier Carlin & Curfman LLC

(57) ABSTRACT

A method and a system track network access information for authorized network devices. The access information facilitates tracking movement of the device throughout the network. In addition the access information can be used to detect when an unauthorized device attempts to access the network, posing as an authorized device.

19 Claims, 1 Drawing Sheet

(56) References Cited

OTHER PUBLICATIONS

U.S. Appl. No. 11/217,417, Non-Final Office Action mailed Jul. 10, 2008, 12 pgs.
U.S. Appl. No. 11/217,417, Advisory Action mailed Mar. 3, 2009, 3 pgs.
U.S. Appl. No. 11/217,417, Advisory Action mailed Mar. 17, 2010, 3 pgs.
U.S. Appl. No. 11/217,417, Final Office Action mailed Jan. 6, 2010, 21 pgs.
U.S. Appl. No. 11/217,417, Final Office Action mailed Jun. 22, 2011, 17 pgs.
U.S. Appl. No. 11/217,417, Non Final Office Action mailed Jan. 21, 2011, 20 pgs.
U.S. Appl. No. 11/217,417, Non Final Office Action mailed Oct. 11, 2011, 9 pgs.
U.S. Appl. No. 11/217,417, Non-Final Office Action mailed May 13, 2009, 22 pgs.
U.S. Appl. No. 11/217,417, Notice of Allowance mailed Apr. 10, 2012, 9 pgs.
U.S. Appl. No. 11/217,417, Response filed Jan. 6, 2012 to Non Final Office Action mailed Oct. 11, 2011, 7 pgs.
U.S. Appl. No. 11/217,417, Response filed Feb. 13, 2009 to Final Office Action mailed Dec. 16, 2008, 12 pgs.
U.S. Appl. No. 11/217,417, Response filed Mar. 8, 2010 to Final Office Action mailed Jan. 6, 2010, 15 pgs.
U.S. Appl. No. 11/217,417, Response filed Mar. 16, 2009 to Advisory Action mailed Mar. 3, 2009, 7 pgs.
U.S. Appl. No. 11/217,417, Response filed May 20, 2011 to Non Final Office Action mailed Jan. 21, 2011, 10 pgs.
U.S. Appl. No. 11/217,417, Response filed Aug. 29, 2008 to Non Final Office Action mailed Jul. 10, 2008, 11 pgs.
U.S. Appl. No. 11/217,417, Response filed Sep. 14, 2009 to Non Final Office Action mailed May 13, 2009, 13 pgs.
U.S. Appl. No. 11/217,417, Response filed Sep. 22, 2011 to Final Office Action mailed Jun. 22, 2011, 9 pgs.

* cited by examiner

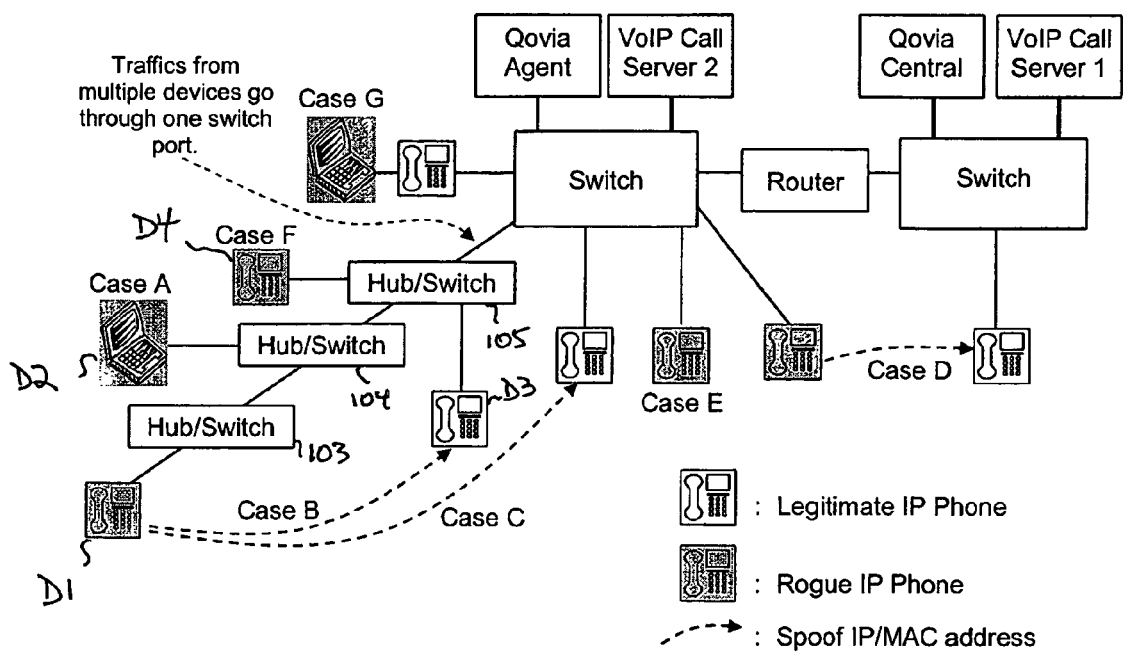

SYSTEM AND APPARATUS FOR ROGUE VOIP PHONE DETECTION AND MANAGING VOIP PHONE MOBILITY

CLAIM OF PRIORITY

This application is a continuation of and claims the benefit of priority under 35 U.S.C. §120 to U.S. patent application Ser. No. 11/217,417, filed on Sep. 2, 2005, which is hereby incorporated by reference herein in its entirety.

FIELD OF INVENTION

The present invention relates to device detection within a communication network and can be more specifically applied to IP phone detection within an IP network.

BACKGROUND

A new emerging telephony technology, Voice over IP (VoIP), proposes numerous advantages over Public Switched Telephone Network (PSTN). One of them is a relatively painless mobility of the VoIP phone. Users can easily move their phone from one such port to another in the communication network without any configuration change, just like hooking up appliances to a power outlet. However, this mobility can create a headache for VoIP network administrators. When users are allowed full freedom to move their phone, administrators can become totally blind to which phones are connected to which switch port. Failing to keep track of phone location means that correct phone position cannot be provided in case there is a request from E911 system. In addition it leaves the network susceptible to access by unauthorized devices posing as authorized devices. A rogue phone can easily tap into the network and start unauthorized service or launch an attack on others.

One proposed response to the problem is to fix one switch port to be dedicated for one VoIP phone only so that a switch forwards only the traffic originated from the Media Access Control (MAC) address of that phone. IT staff manually enters to a switch a phone MAC address to be locked up to a specific switch port. However, this one switch port per IP phone approach is too cumbersome and drains immense amount of man hours to manage.

Another alternative is to rely on a switch's automatic filter set up. In this proposed solution the switch sets the first MAC address it sees as the only authorized device. Traffic from other MAC address would then be blocked at the port. This one IP phone-per-port approach also requires human attention when a need arises to change the initial setting.

When phone access has not been encumbered in the manner disclosed, the network has been susceptible to access that could be detrimental to the network, examples of which are set out below.

Access through a Daisy Chained Switch

As can be seen in FIG. 1, a rogue phone can be plugged in to network by daisy chaining a switch port. An inexpensive 4 or 8 port hub/switch can expand the Ethernet port easily.

The issue is that, from the viewpoint of network administrator or management tool, all of the devices hooked to the cascaded hub/switches are identified by one switch port. For example, all of the Hub/Switches 103-105 all are identified as being on the same port of switch 110. In addition all of the devices hooked to those Hub/Switches (e.g., D1 to D4) are identified as being on the same port. This makes it even harder to detect a rogue device because traffic from both legal and illegal phones can only be routed through one switch port.

Another issue that arises is that when a device is plugged to a cascaded hub/switch, an SNMP trap cannot be generated because the switch cannot detect the cable plugged into the cascaded hub/switch.

Spoofing a Legitimate IP/MAC Address

An intruder can spoof an IP/MAC address of a legitimate or authorized phone and program it on his or her device overwriting the hardware address of the intruding device. From a VoIP call server or network administrator's view, there is no way to tell if the phone is authorized or not by merely looking at the IP/MAC address. The rogue phone is treated same as legal one, resulting in two or more identical IP/MAC addresses present on network.

Layer 3 Switch

If frames generated from a device cross a subnet boundary, a system monitoring the traffic cannot grab the MAC address of that device by any means because that address is stripped off by a router. Also, if a layer 3 switch is involved in switching, the MAC address in the frame header is not necessarily that of traffic source.

In other words, when remotely monitoring traffic from IP phones, it is difficult to get a correct MAC address for that phone except when only layer 2 switch is involved in switching.

Possible Cases of Intrusion.

It can be safely anticipated that the rogue device will spoof IP/MAC address of legitimate user. In FIG. 1, a device at ending point of dotted arrow points to a legal device whose address is being spoofed by a rogue device. There can be three ways the rogue device can pick a MAC address. One technique is to pick randomly a MAC address without spoofing. A second is to spoof a device address which is on the same daisy-chain branch. A third is to spoof the address of a device that is plugged on a switch port that is different from the port to which the rogue device is connected. Depending on the MAC address that the rogue phone spoofs and the switch port to which the device is plugged in, the following possible cases of intrusion, as shown in FIG. 1, can happen.

Case A: Soft Phone on a PC

Installing a VoIP soft-phone on a legitimate PC.

Case B: Rogue Phone on Daisy-Chain

A rogue phone is connected to one hub/switch of a daisy chained port and it is stealing IP/MAC of a legitimate phone that is hooked up to the same daisy chain. Traffic generated from both phones travel through same switch port.

Most legitimate phones remain powered on 24×7 and as a result the IP/MAC addresses of those phones are always active. When a rogue phone spoofs this address, it will collide with that of legitimate phone as they are on same subnet. It is questionable if rogue phone can make a phone call and how the VoIP call server would respond to this request because of the MAC address conflict. The result might be dependent on whether a hub or a switch is used.

Case C: Rogue Phone on Daisy-Chain

A rogue phone is connected to one hub/switch of a daisy chained port and it is stealing an IP/MAC address of a phone that is hooked up to the switch directly via a different port. Traffic generated from both phones travel through different switch ports of the same switch. Both phones cannot be on-line simultaneously as the MAC address collides. However, if the legitimate phone is off or unplugged the rogue phone can use the spoofed address for access.

Case D: Rogue Phone on Switch Port Direct

A rogue phone is connected to a switch directly and it is stealing MAC address of a phone on a different subnet. Traffic generated from both phones travel through different switch ports. Both phones may be on-line simultaneously if different IP addresses are used. The rogue phone will be able to make phone calls without any problem because VoIP call server identifies a phone by MAC address not by its IP address. But this scenario is possible when there is only one VoIP call server servicing the whole campus or university. One thing that is not clear is the case when there are multiple VoIP call servers servicing different subnets. As seen in FIG. 1, say a legitimate phone is serviced by VoIP call server 1 and rogue phone by VoIP call server 2; the legitimate phone is registered on VoIP call server 1 and rogue phone is to be served by VoIP call server 2. Unless there is a database sharing or synchronization between the two VoIP call servers, the rogue phone won't be able to make phone call.

Case E: Rogue Phone on Switch Port Direct

The intruder introduces some arbitrary MAC address which is not registered on VoIP call server. It won't be able to make legitimate call but could generate a malicious attack like a denial of service (DOS).

Case F: Rogue Phone on Daisy-Chain

A rogue phone is connected to one hub/switch of a daisy chained port and it is not stealing IP/MAC address. It introduces some arbitrary MAC address which is not registered on VoIP call server.

Case G: Phone with Built-in Extra Port

IP phone usually has an extra hub port for a PC or any Ethernet device can be hooked to. A legitimate phone is directly connected to switch port and a PC is daisy chained to the phone.

SUMMARY OF THE INVENTION

All of these cases create potential issues for the VoIP service provider that may negatively affect service performance.

In accordance with one aspect of the invention a method and system detects phone movement on a VoIP network. This enables an administrator to keep track of where the phones are. A rogue IP phone also can be detected by slightly adjusting the strategy. According to one embodiment the method and system investigate every possible case of a rogue phone accessing the network followed by extensive strategies to detect them in different cases. The disclosed embodiment builds a database, called an Access Control List (ACL), which can be used for tracing phone movement, detecting rogue devices, and/or physically locating a phone for Extended-911 (E911) use.

Thus, in accordance with the invention a method and system can detect phone movement from one location to another; enforce the phone movement by blocking service for unauthorized phone move; detect rogue IP phone plugged to VoIP network immediately, notify the IT staff of the intrusion and block the calls originated from the phone; locate the IP phone physically, whether it is legitimate or not; and provide IT staffs with a means to enable and disable a switch port.

BRIEF DESCRIPTION OF THE DRAWINGS

FIG. 1 is a block diagram of a system in which an embodiment of the invention may be used.

DETAILED DESCRIPTION

Recognizing the potential problems arising for rogue devices seeking network access, and the desirability of tracking the movement of authorized devices, the present invention provides a technique that gathers device profile information for devices connected to the network. The gathered profile information is processed to identify rogue devices and/or to identify and/or track movement of an authorized device.

One of the reasons why intrusion by a rogue IP phone is possible is a lack of enforcement at an Ethernet switch through which the rogue phone seeks access to all network resources. Without changing any configuration and without getting any permission from a network administrator, a device can have access to the MAC layer by simply being plugged into the port. A device can freely start sending and receiving MAC frames regardless of its contents, source or destination MAC address.

The following detection strategies are disclosed to overcome this problem.

Access Control List (ACL)

If the system was able to enforce a rule such that only a pre-registered device is allowed to go on-line through one specific switch port, it is easier to detect a rogue IP phone that spoofs a legitimate IP/MAC address. In this regard, a solution should start from building an association between a switch port and a MAC address of an authorized device. To list attributes of the association;

<<switch_IP, switch_port, auth_phone_MAC>>

, where switch_IP means the IP address of a switch, switch_port is a switch port number, auth_phone_MAC is the MAC address of an authorized IP phone. The list can either be built from scratch or by taking a snapshot of the current network topology. To take a snapshot, a list of all switch IP addresses in the network of interest is required as a starting point. By querying each of the switches in the list via SNMP, the association among switch_IP, switch_port and auth_phone_MAC can be discovered and stored.

The association can include additional information such as phone extension number and location information yielding a list of attributes such as <<switch_IP, switch_port, auth_phone_MAC, phone_IP, ext_number, location_info, user_info>>

The List is Referred to as, Access Control List (ACL).

To keep the database up-to-date, whenever a phone is connected to a new port or disconnected from its current port, these events are used to update in the database near real-time.

For example, an embodiment of the invention builds and maintains access history of IP phones. It contains all the previous switch IP addresses and port numbers a phone was once connected to and disconnected from along with time and date the event(s) happened. To represent the idea in the context of attributes, a record of the type shown below is stored in database for each MAC address of IP phones;

<<Time_1, switch_IP_1, switch_port_1, Connected>>
<<Time_2, switch_IP_1, switch_port_1, Disconnected>>
<<Time_3, switch_IP_2, switch_port_2, Connected>>
<<Time_4, switch_IP_2, switch_port_2, Disconnected>>
:
:
<<Time_n, switch_IP_n, switch_port_n, Connected>>

This access history will maintain the above information for all the phones under its supervision. This data will be used as one of the sources of information when it is necessary to discern a rogue IP phone from a normal phone move. This will be discussed further below.

Detecting Rogue IP Phone—Cases C, D and E.

A key point in identifying a rogue IP phone is to track down the switch port to which the rogue phone is plugged. This port data can be compared with the port number of a connected legitimate phone, whose MAC address has been spoofed by the rogue phone. It is a rogue phone if MAC address matches but switch IP address or port number mismatch.

The ACL, as was explained before, should be built to contain legitimate MAC addresses and a switch port that such addresses are authorized to plug into. Once the database is ready, a detection algorithm can be put into operation.

Four different detection strategies are disclosed here. They can be deployed in combination depending on the network topology and enforcement policy.

Detection by Traffic Monitoring Based on MAC Address

This process relies on an agent monitoring all the VoIP traffic from IP phones. It examines a MAC address of a VoIP packet originated from the subnet with which the agent is associated. It is assumed that all device MAC addresses are conveyed up to the agent's monitoring point. This technique may not work when a layer3 switch is used, where the device MAC address is usually stripped off while frame crosses a subnet boundary.

When a new phone is plugged to a port, the agent would query the switch and determine the port number to which it is connected. By comparing the discovered port number with the port number in ACL which it is supposed to be hooked up to this MAC address, we can detect if the new phone is a rogue one. A possible set of steps for performing this process are as follows 1. Agent constantly monitors MAC of all VoIP calls under its supervision.
2. A rogue IP phone is plugged in with spoofed MAC address, called MAC_spoofed.
3. SNMP trap (switch_IP, switch_port) generated, which triggers Agent to stay in alert mode keeping eye on the port.
4. Suppose a new call is initiated from a rogue phone.
5. Agent detects new call originated from MAC_spoofed.
6. Agent queries all the switches under its supervision asking from which port the MAC_spoofed frames originated. Switch_IP and switch_port obtained at step 3 can be a cue for the search. Call the returned answers switch_IP_found and switch_port_found.
7. Check the (switch_IP_found, switch_port_found, MAC_spoofed) against ACL.
8. If MAC address matches, but switch_IP or switch_port does not match, it is rogue phone or moved one.

Detection by Traffic Monitoring Based on IP Address

There can be cases where an agent cannot grab the device MAC address by any means because it is stripped off when a frame crosses a subnet boundary or it is incorrect if layer 3 switch is involved in switching. This alternative detection process relies on an IP address rather than on MAC address. So, it is adequate regardless of whether the agent is located at a different subnet or the same subnet as the IP phone. It also works when Layer3 switch is used.

In the alternative, the basic idea is to monitor all the VoIP traffic and whenever a new call is discovered, the agent tries to find the MAC address and switch port number given source IP address of the call. It queries switch via SNMP. A possible set of steps for performing this process is as follows.

1. Agent constantly monitors IP address of all VoIP calls under its supervision.
2. A rogue IP phone is plugged in with spoofed MAC address, called MAC_spoofed.
3. SNMP trap (switch_IP, switch_port) generated, which triggers Agent to stay in alert mode keeping eye on the port.
4. A new call is initiated from rogue phone.
5. Agent detects a new call with IP_address originated from a could-be-rogue device.
6. Agent queries via SNMP all the switches under its supervision asking from which port the IP_address packets originated and what is the MAC address of the device. Switch_IP and switch_port obtained at step 3 can be a cue for the search. Let's call the returned answers switch_IP_found, switch_port_found and MAC_found.
7. Check the (switch_IP_found, switch_port_found, MAC_found) against ACL.
8. If MAC address matches, but switch_IP or switch_port does not match, it is rogue phone or moved one.

Detection by Monitoring Heartbeat Exchange

Another alternative detection process analyzes "heartbeat" messages. The purpose of generating a heartbeat message is to let the other end, such as a VoIP call server or phone, know a phone is present and "alive". It is sent out periodically to the phone's peer(s) and if such a signal is not detected or received within a period by the peer, the phone is regarded to be "dead" or malfunctioning by that peer. This method is adequate only if contents of heartbeat messages, exchanged between IP phone and VoIP call server, can be decoded. It is assumed that the heartbeat messages contain IP and MAC addresses of the devices in the message payload, not in the header.

The basic idea is to constantly monitor the heartbeats and keep track of new phones plugged in or removed. When a new call shows up, the switch is queried via SNMP, and the agent tries to find the MAC address and switch port number, given source IP address of the call. A possible set of steps for performing this process is as follows 1. Agent constantly monitors all the heartbeat messages exchanged between VoIP call server and VoIP phones under its supervision.
2. Decoding the heartbeat messages, agent retrieves IP and MAC address of IP phone and maintains a list of active MAC and IP address.
3. Check if any new IP/MAC address shows up against the active phone list.
4. If new IP/MAC shows up while decoding the heartbeat, Agent queries via SNMP all the switches under its supervision asking from which switch port the IP/MAC address originated. The returned answers are referred to as switch_IP_found and switch_port_found.
5. Check the (switch_IP_found, switch_port_found, MAC/IP) against ACL.
6. If MAC address matches, but switch_IP or switch_port does not match, it is rogue phone or a moved one.

Detection by SNMP Trap

Yet another alternative detection process is available, but this method does not rely on traffic monitoring and takes some time to detect. As it depends upon SNMP trap which is not 100% reliable, it may be of more limited value if used as a sole measure.

The basic idea in this alternative is to catch SNMP trap generated by a switch when a phone is plugged in and query the switch as to what is the port number the phone is plugged. A possible set of steps for performing this process is as follows 1. A rogue IP phone is plugged in with spoofed MAC address, called MAC_spoofed
2. SNMP trap (switch_IP, switch_port) is generated.
3. Agent issues SNMP query to switch_IP asking what the MAC address of devices plugged to switch_port are. It may take a couple of minutes for a switch to discover device MAC address. The MAC address found can be referred to as MAC_found.
4. Check the (switch_IP, switch_port, MAC_found) against ACL
5. If MAC address matches, but switch_IP or switch_port does not match, it is rogue phone or moved one.

Detection by SNMP Polling

Yet another detection process also does not rely on traffic monitoring and takes some time to detect. It should not be used as a sole measure and should be scheduled to be launched periodically like once a day or once an hour. It supplements other methods by providing a backup check method, especially for the method described above where a trap message could have been missed by the agent. If regular detection fails to capture the device for some reason, this method should be able to detect the miss. A possible set of steps for performing this process is as follows 1. Agent issues SNMP query to all the switches under its supervision asking what the device MAC address plugged to all the switch ports are. Call the found MAC address MAC_found.
2. Check the (switch_IP, switch_port, MAC_found) against ACL
3. If MAC address matches, but switch_IP or switch_port does not match, it is rogue phone or moved one.
4. Repeat steps 1 to 3 until all the switches are covered.

It is unlikely that under these two cases an intruder can make a call because there are two same MAC addresses present in one subnet. Detection methods for these cases are unnecessary.

Detecting Rogue IP Phone—Case F.

An additional process covers case F in FIG. 1, where traffic from multiple devices go through one switch port and the rogue phone is using a randomly picked address but not spoofing any legitimate phone.

The idea is to use a bridge map information of a switch port, which lists MAC/IP address of all the devices whose traffic travels through the port. A possible set of steps for use in this alternative process is as follows 1. Agent constantly monitors IP address of all VoIP calls under its supervision.
2. A rogue IP phone is plugged in with some random MAC address, called MAC_random.
3. A legitimate call cannot go through because MAC address is not registered. However, it can generate attacks, such as DOS.
4. Agent detects a new call or packets with IP_address originated from a could-be-rogue device. If it sees a new IP address that it has never seen before, it becomes suspicious about the address and initiates an investigation.
5. Agent issues SNMP query to all the switches under its supervision asking what is switch port from which IP_address originated. Call the found switch IP address switch_IP_found and switch port switch_port_found.
6. Agent issues SNMP query to switch switch_IP_found and asks for all the MAC addresses associated with switch port switch_port_found. Call the found MAC address lists MAC_found_list. The bridge map in the switch holds the data.
7. For each MAC address in MAC_found_list, check if it is listed in ACL.
8. If a MAC address, MAC_random, is not found in ACL, it is a rogue phone.
9. Repeat step 7 and 8 until all the MAC addresses in MAC_found_list are covered.

Detecting and Enforcing Phone Movement.

If an IP phone is moved from one switch port to another, a strategy similar to that used to detect a rogue device is used to detect the move. This is because, from a network administrator's view, it is basically a MAC address hooked to one switch port moved to another one. As was mentioned in rogue device detection algorithm, when the data (switch_IP_found, switch_port_found, MAC_found) is checked against ACL and if MAC address matches, but switch_IP or switch_port does not match, it is rogue phone or a moved one. Two possible strategies to differentiate rogue from moved are set out below.

Referring to Access History

There is at least one distinct difference between a rogue phone and a moved phone. When a rogue phone with spoofed address is plugged in, there are two same MAC address in the network, one for an authorized or legal one and one for a rogue device.

However, in case of a moved phone, a phone must be physically unplugged before being plugged into a new port. So, at a moment when a phone is plugged into a new port, there is no same MAC address present in network. By referring to the access history explained above it is possible to determine when the phone was disconnected.

Another way to differentiate normal phone move from a rogue phone is to introduce human intervention to the decision process. The basic idea is to have phone user or IT staff enter the phone move schedule before the actual move. A processing center can gather the information and build a list of phones scheduled to move. Based on the information, the detection algorithm knows that there will be a legal phone movement in advance. When the phone is actually unplugged from a current switch port and plugged to a new port for the move, the processing center detects it and checks if a MAC address of the phone is listed in moving list. If it is in the list, the switch port will not be blocked, accordingly. If the phone move is not scheduled in advance as mentioned above, the move is considered unauthorized and the phone involved in the move is detected as a rogue phone. By doing this a network administrator can automatically keep track of switch and ports for the phones that are plugged into the network.

By implementing the above idea, the ACL can be automatically maintained up to date. It provides updated information about which switch and port an IP phone is plugged. Given searching based on phone extension number or IP/MAC address it is possible to look for location information in ACL, so that the phone location is physically identifiable, rendering information such as street address, building name, room number or floor.

Blocking Switch Port

If the phone is identified as a rogue phone a call from such a phone can be blocked at the switch port level by having an agent issue a SNMP command to disable the switch port to which the rogue phone is plugged in. Then the agent notifies administrator of the intrusion and port blocking. However, as the VoIP call server does not have any idea what is going on, it will still keep the call from rogue phone intact including the PSTN segment of connection. To resolve this issue, an agent may rely on heartbeat message exchanged between VoIP call server and phone. If VoIP call server does not receive heartbeats from phone, it will time out and tear down the call.

One issue may continue to exist, for example, in Case A in FIG. 1 if the port is blocked, the PC user won't be able to access network at all including data access. It can be considered as some kind of punishment for breaking in. The port can be automatically re-activated after some time later.

In another alternative, an agent can request that a VoIP call server tear down the connection known to be from rogue phone. This method is preferred because, if the call goes through PSTN gateway, the VoIP call server will release PSTN segment of the connection as well as that of IP. However, we could not find any way that can make VoIP call server to release the call.

Alternatively, a network user could be allowed to access campus network only for data communication but not VoIP calls. In this case, the switch port for the user should not be blocked. Instead, only the VoIP call should be blocked at application level allowing the data traffic to move back and forth freely.

However, the problem can be solved by selectively applying the detection algorithm disclosed here.

Thus by compiling data that profiles devices coupled to a communications network, the compiled profiles can be used to track device movement and/or identify rogue devices attempting to access the network. Throughout this application the description of the embodiment refers to an agent. One skilled in the art would understand that there is a software construction designed to operate in this particular environment to perform the process and functions described herein.

What is claimed is:

1. A method comprising:
   detecting an attempted voice over Internet protocol (VoIP) call by a device on a communications network;
   identifying switch port data and addressing data for the device initiating the attempted VoIP call;
   identifying the device based at least in part on the switch port data;
   determining whether the device has been previously disconnected from the communications network based on the addressing data;
   blocking, based on identifying the device and determining that the device has not been previously disconnected from the network, the VoIP call at an application level while allowing data traffic to move across a switch port indicated by the identified switch port data; and
   allowing the VoIP call based on identifying the device and determining that the device has been previously disconnected from the communications network.

2. The method of claim 1, wherein the identifying of the device comprises comparing the switch port data to a port number associated in an access control list with the addressing data, the addressing data including at least one of a Media Access Control (MAC) address and an IP address of the device.

3. The method of claim 2, wherein the identifying of the device comprises determining that the switch port data indicates a switch port number that is different from the switch port number associated in the access control list with the MAC address of the device.

4. The method of claim 2, further comprising detecting the MAC address of the device by examining MAC address information of a VoIP packet originating from a subnet with which the device is associated.

5. The method of claim 2, further comprising automatically maintaining the access control list responsive to detection of IP phone movement from one switch port to another.

6. The method of claim 1, wherein the identifying of the device comprises determining that the device is a rogue IP phone.

7. The method of claim 6, wherein determining that the device is a rogue IP phone comprises, responsive to detecting that the device has been disconnected from one switch port and connected to another switch port, determining that a MAC address of the device is not listed in a moving list that indicates scheduled movement of IP phones.

8. The method of claim 6, further comprising compiling a database that includes an access history for a plurality of devices to track device movement for identifying rogue IP phones, the access history including a current connection status for the plurality of devices.

9. The method of claim 1, wherein determining whether the device has been previously disconnected from the communications network based on the addressing data comprises analyzing an access control list that includes a time at which the device was connected to or disconnected from the communications network.

10. The method of claim 1, wherein blocking the VoIP call at the application level comprises blocking only data associated with the VoIP call, to allow all other data traffic to pass through the switch port.

11. A system comprising:
    a monitoring agent that is operatively connected to a communications network to monitor voice over Internet protocol (VoIP) calls from a plurality of devices in the communications network, the monitoring agent being configured to:
    detect an attempted VoIP call by a device on a communications network;
    identify switch port data and addressing data for the device initiating the attempted VoIP call;
    identify the device based at least in part on the switch port data;
    determine whether the device has been previously disconnected from the communications network based on the addressing data;
    block, based on identifying the device and determining that the device has not been previously disconnected from the network, the VoIP call at an application level and allow data traffic to move across a switch port indicated by the identified switch port data; and
    allow the VoIP call based on identifying the device and determining that the device has been previously disconnected from the communications network.

12. The system of claim 11, wherein the monitoring agent is configured to identify the device as an unauthorized device by comparing the switch port data to a port number associated in an access control list with the addressing data, the addressing data including at least one of a Media Access Control (MAC) address and an IP address of the device.

13. The system of claim 12, wherein the monitoring agent is configured to identify the device as an unauthorized device by determining that the switch port data indicates a switch port number that is different from the switch port number associated in the access control list with the MAC address of the device.

14. The system of claim 12, wherein the monitoring agent is configured to detect the MAC address of the device by examining MAC address information of a VoIP packet originating from a subnet with which the device is associated.

15. The system of claim 12, wherein the monitoring agent is configured to automatically maintain the access control list responsive to detection of IP phone movement from one switch port to another.

16. The system of claim 11, wherein the monitoring agent is configured to determine that the device is a rogue IP phone.

17. The system of claim 16, wherein the monitoring agent is configured to determine that the device is a rogue IP phone by a process comprising:
    responsive to detecting that the device has been disconnected from one switch port and connected to another switch port, determining that a MAC address of the device is not listed in a moving list that indicates scheduled movement of IP phones.

18. The system of claim 17, wherein the monitoring agent is configured to compile a database that includes an access history for a plurality of devices to track device movement for identifying rogue IP phones.

19. The system of claim 11, wherein the monitoring agent is configured to block only data associated with the VoIP call at the application level, and to allow all other data traffic to pass through the switch port.

\* \* \* \* \*